(12) United States Patent
Champaigne et al.

(10) Patent No.: US 8,899,883 B2
(45) Date of Patent: Dec. 2, 2014

(54) ANCHOR TENDON WITH SELECTIVELY DEFORMABLE PORTIONS

(76) Inventors: Denis Champaigne, Sudbury (CA);
Ming Cai, Sudbury (CA)

( * ) Notice: Subject to any disclaimer, the term of this patent is extended or adjusted under 35 U.S.C. 154(b) by 51 days.

(21) Appl. No.: 13/261,338

(22) PCT Filed: Dec. 22, 2009

(86) PCT No.: PCT/CA2009/001892
§ 371 (c)(1),
(2), (4) Date: Jun. 21, 2012

(87) PCT Pub. No.: WO2011/075810
PCT Pub. Date: Jun. 30, 2011

(65) Prior Publication Data
US 2013/0028667 A1    Jan. 31, 2013

(51) Int. Cl.
*E21D 21/02* (2006.01)
*E21D 20/02* (2006.01)
*F16B 13/14* (2006.01)
*E21D 21/00* (2006.01)

(52) U.S. Cl.
CPC .............. *E21D 21/02* (2013.01); *F16B 13/141* (2013.01); *E21D 21/004* (2013.01)
USPC .......................................... 405/259.5; 411/9

(58) Field of Classification Search
USPC .................................. 411/8, 9, 292, 82, 392; 405/259.1–259.6
See application file for complete search history.

(56) References Cited

U.S. PATENT DOCUMENTS

| 4,393,638 | A | * | 7/1983 | Sell et al. ................... 52/704 |
| 5,873,689 | A |   | 2/1999 | Mensour et al. |
| 6,086,305 | A | * | 7/2000 | Lat et al. ................... 411/487 |

FOREIGN PATENT DOCUMENTS

| CA | 2240144 A1 | 1/1999 |
| CA | 2383544 A1 | 1/2002 |
| CA | 2510178 A1 | 7/2004 |
| CA | 2677760 A1 | 3/2006 |
| CA | 2682332 A1 | 7/2008 |

\* cited by examiner

*Primary Examiner* — Sunil Singh

(57) ABSTRACT

A mine roof support system includes an elongated anchor rod or tendon having a rigid non-deformable distalmost anchoring end portion, and one or more axially deformable portions which are configured to deform in the event load forces exceed a threshold force approximating the forces during a rock burst or rock dilation event. The rigid anchoring portion is provided with primary anchor members such as ribs, grooves, studs and the like. The primary anchor members are configured to reduce bar plasticity, and fixedly secure and retain the rigid portion in place in a drill hole. In the event rock forces exceed the threshold force, the plastically deformable portions elongate with the dilating rock to accommodate and absorb the rock forces.

25 Claims, 5 Drawing Sheets

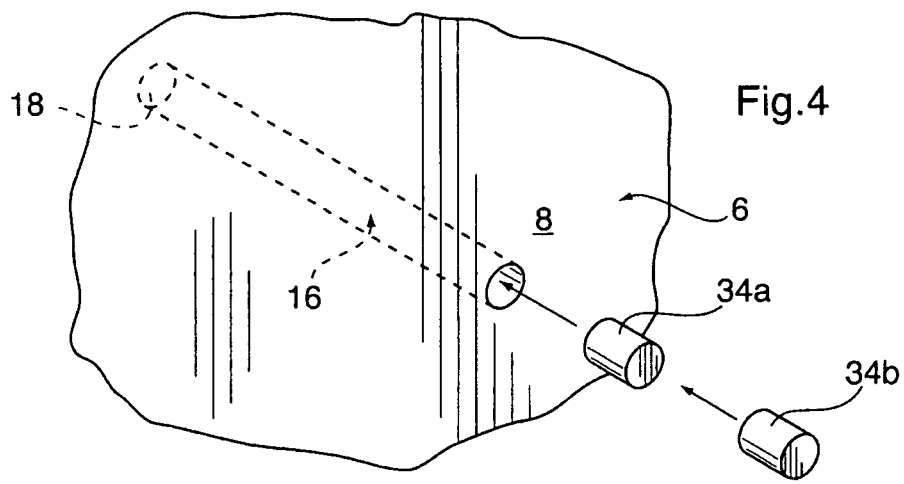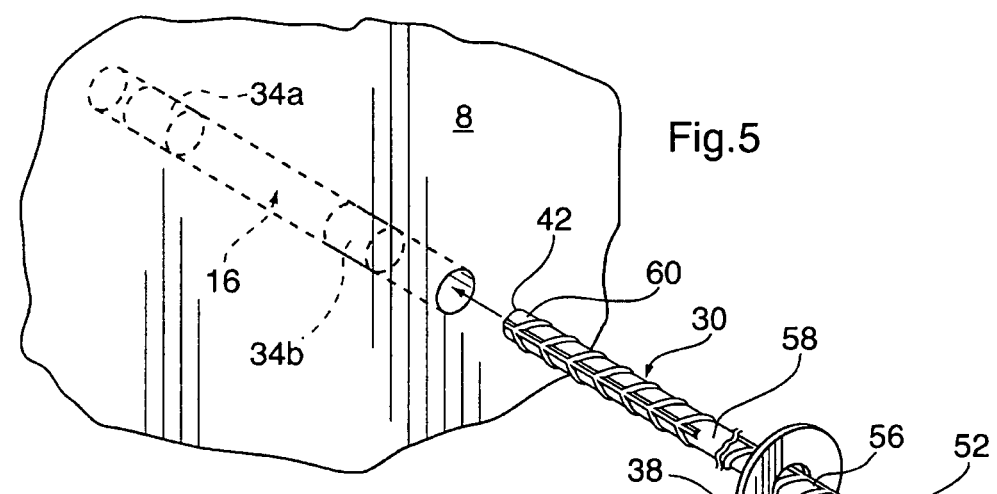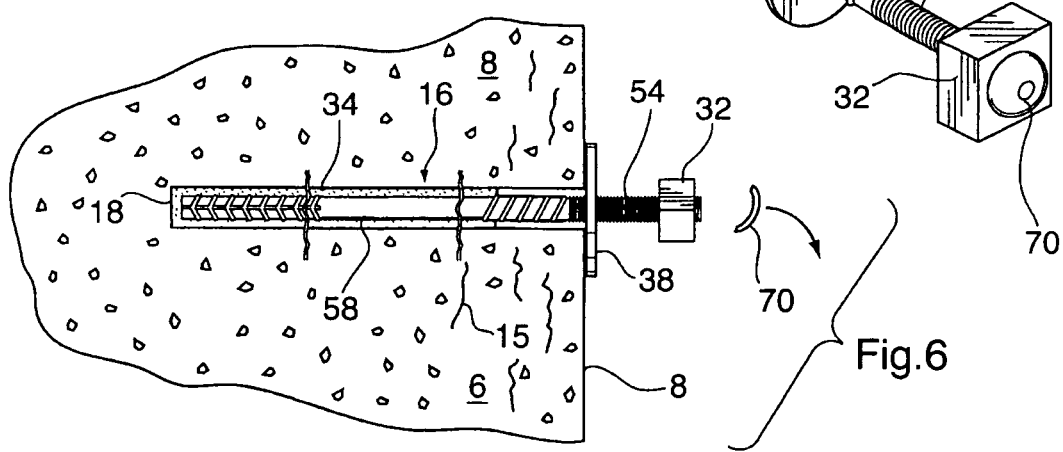

Fig.3 Comparison of the load-displacement relation of the present anchor bolt to that of the traditional rebar. The shadowed areas indicate the energy the bolts can absorb before failure.

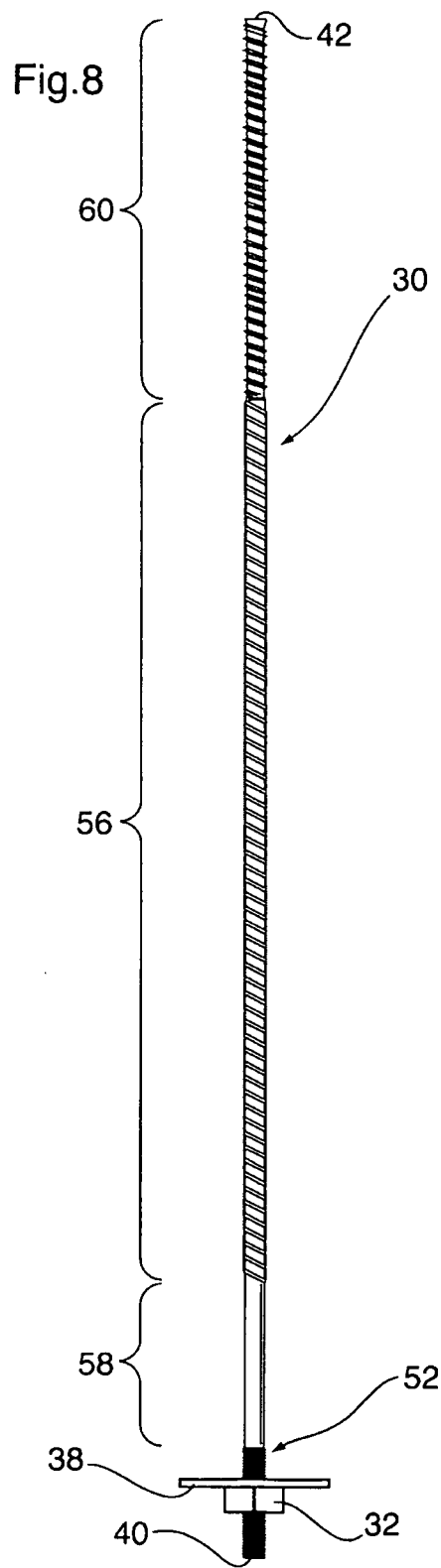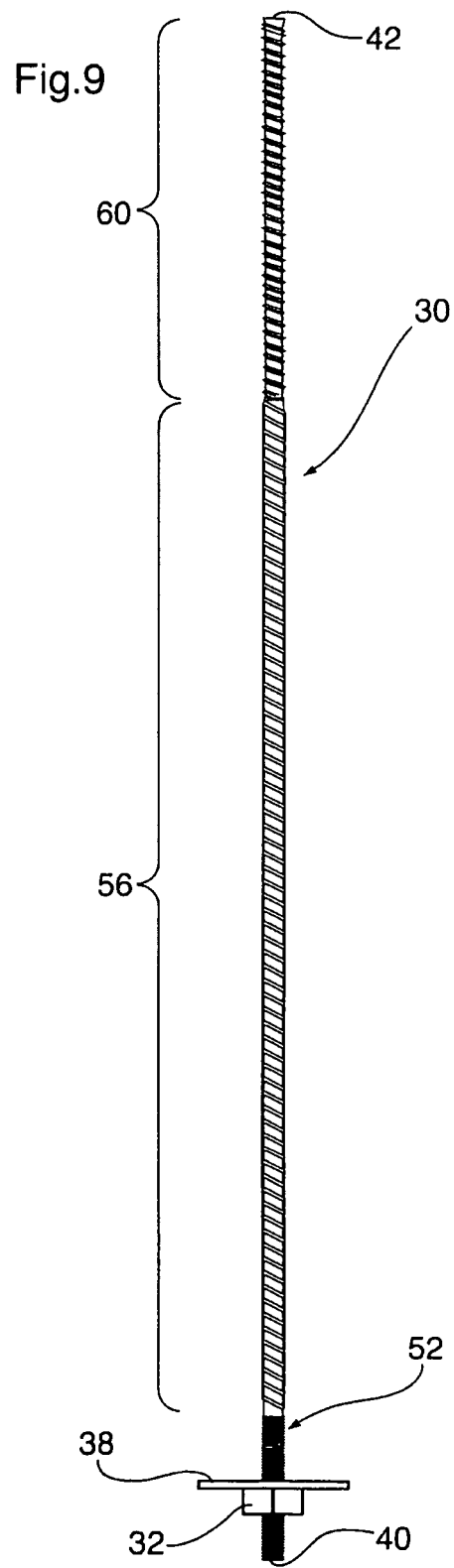

ANCHOR TENDON WITH SELECTIVELY DEFORMABLE PORTIONS

SCOPE OF THE INVENTION

The present invention relates to a retaining wall or mine roof bolt assembly, and more particularly, a bolt assembly which includes a reinforcing anchor bolt or tendon having one or more selectively deformable portions. The deformable portions are configured to preferentially plastically deform and/or axially elongate in response to ground or load forces which exceed a predetermined threshold force, to assist in the absorption and dissipation of load forces.

BACKGROUND OF THE INVENTION

In conventional mine roof and wall support systems (hereinafter collectively referred to as "mine roof support systems") a threaded rod-like reinforcing tendon or rebar is imbedded into a bore or drill hole which is drilled into a rock complex. Depending upon the diameter of bar stock used, conventional anchor tendons are generally installed in bore holes which range in diameter from about 25 to 50 mm. Conventional reinforcing tendons are provided with a threaded proximal end which, when the tendon is seated, projects outwardly from the rock face. A nut or other suitable threaded fastener is threaded onto the projecting end of the tendon and tightened against the rock face to compress and consolidate rock forces, and prevent or control ground movement.

Typically, conventional reinforcing tendons consist of a four to eight foot long steel rod which is provided with ribs, or which is otherwise crimped or grooved along its non-threaded length. The ribs or grooves provide a mechanical engagement with anchoring resin or grout used to couple the tendon to the surrounding rock strata in the bore hole.

U.S. Pat. No. 5,873,689 to Mensour et al. which issued 23 Feb. 1999 describes a prior art method and system of securing an anchoring tendon or rebar in a bore hole by the use of one more resin cartridges. Typically, a number of two-part resin cartridges are inserted into the bore hole immediately ahead of the tendon. Following resin cartridge placement, the anchor tendon is slid axially into the bore hole and driven through the cartridges resulting in their rupture and resin mixing. Following mixing, the resin cures and sets. The resulting engagement between the set resin, the sides of the drill hole and the ribbed or crimped portions of the anchoring tendon, fixedly retains the tendon in place. The friction fit created by the encapsulation of the anchor tendon by the resin or grout allows the transfer of load forces which occurs from dilating adjacent rock to the tendon.

In situ testing in mine applications has shown that resin encapsulation along as little as 30 cm of the length of the tendon may be sufficient to achieve breaking strength of a 20 mm diameter rebar under a threshold fracture force. The applicant has appreciated that in fully grouted bolt installations, where the anchor tendon is substantially encapsulated along its entire axial length to a distance of 50 cm or less, and typically within about 25 cm or less from the rock face, the tendon maybe subject to an increased chance of premature failure as a result of differential ground movement. In particular, when ground movement occurs, and dilating rock forces transferred to the tendon exceed the threshold fracture force of the steel, the tendon will tend to break either in the threaded section at the proximalmost end of the bore, where the threading typically produces a reduced diameter portion of the bar, or alternately along mid-portions of the tendon at the dynamic/stable rock interface. Typically, the failure of the tendon results from the overall bar stiffness and the inability of the tendon to plastically deform.

The threaded section of the anchor tendon or rod is generally smaller in diameter than the remaining ribbed section, as a result of the machining process during thread formation. When an anchor bolt fractures or breaks across its threaded end, any connection with mesh screens or other surface retention elements used to capture falling rock and debris is lost. As a result, in conventional anchor tendons, the strength and plasticity of the bar is underutilized, since the steel in the threaded section will begin to deform and yield first.

Furthermore, in underground mine applications, shock forces produced by blasting in initial tunnel formation often produces a fractured or loosened rock zone immediately adjacent to the rock face. The fractured rock zone is typically most pronounced within 1 meter of the rock face, depending upon the particular strata. Frequently, conventional anchors fail across the fractured or loosened rock zone, as a result of differential ground movement between dilating and fixed rock strata. Where an anchor bolt or tendon fractures distally from its threaded end, failure most typically occurs along the portion of the anchor tendon which is laterally adjacent to the fracture rock zone as a result of the bar rigidity, and the inability of the tendon to compensate for dynamic load forces.

SUMMARY OF THE INVENTION

According to one aspect of the invention, deformations are selectively formed on selected surfaces of an anchor rod or bolt. The deformations are created having varying heights, spacing and dimensions over selective sections to control the anchor stiffness along a given section of the anchor tendon and provide selected sections of the tendon with the ability to preferentially plastically deform and/or elongate ahead of others. In particular, the applicant has appreciated that increasing the height and/or depth of the bar deformation will increase bar stiffness and rigidity, reducing the deformation range of a given bar section. Similarly, reducing the number and/or depth of the bar deformation may advantageously decrease the stiffness and increase the ability of the bar section to plastically deform. Varying the interval of the bar deformations and/or the deformation orientation and configuration may also be used to vary the plastic properties of an anchor tendon section allowing bar stiffness of a particular section can now be controlled.

To at least partially overcome some of the disadvantageous associated with prior art mine roof support systems, the present invention provides for an anchor bolt or tendon which extends longitudinally from a threaded proximal end to a distal end which is remote therefrom. The anchor bolt or tendon is preferably fabricated from metal, such as a steel bar, however other bar constructions are possible. At least one rigid anchoring portion is provided a distance from the proximal end. The rigid anchoring portion is provided with a series of deformations or protuberances which are configured to reduce bar plasticity along the portion and fixedly secure and retain the rigid portion in place in a bore or drill hole. In a simplified construction, the rigid anchoring portion is provided with a series of primary anchor members which are configured to engage an anchoring resin, cement or grout (hereinafter collectively referred to as "anchoring grout") to fixedly secure the rigid anchor portion in a drill hole against movement relative to laterally adjacent rock strata. The primary anchoring members may include without limitation one or more ribs, bosses, grooves, studs, striations, slots, indentations or other physical structures which are selected to provide enhanced surface contact between the anchoring grout and the adjacent sold rock.

The anchor bolt further includes one or more deformable portions, which are adapted for axially elongation in the event that rock burst or dilation forces exceed the threshold force. The deformable portions of the bolt may thus lengthen or elongate axially with dilating rock, to accommodate and absorb the rock forces, without failing.

An object of the invention is therefore to provide a mine roof support system which includes an elongated anchor bolt or tendon which is provided with a substantially non-deformable distalmost anchoring end portion, and at least two deformable portions are configured to axially deform with differing degrees of plasticity; in the event load forces exceed a predetermined threshold force which approximates the forces achieved during a rock burst or rock dilation events.

Another object of the invention is to provide an elongated anchor bolt or tendon for use in wall and mine roof support systems, and which has a conventional exterior threaded end portion which is engagable by a nut or threaded fastener and at least one, and preferably a plurality of, deformable portions which are selected to deform and axially elongate in the event rock or load forces exceed a predetermined threshold force.

A further object of the invention is to provide an anchor tendon or bolt for use in a mine roof support system, and which is suitable for use in compressing and consolidating rock forces not only where static support is required, but also in rock complexes requiring dynamic support.

Most preferably, the anchor bolt or tendon is provided for use as part of a mine roof support assembly for securement in a drill hole is pre-formed in a rock complex, by its engagement with a suitable anchoring grout. Although not essential, most preferably the mine roof bolt assembly is a fully grouted bolt assembly, in which following placement, the bolt is substantially encapsulated in the anchoring grout along its entire length upto a distance within about 0.75 meters, and most preferably within about 0.25 meters of the rock face. The tendon is elongated axially and has a size and length selected, such that when the distal end is seated towards the toe or innermost end of the drill hole, the proximal end projects outwardly beyond the rock face, so as to be engagable by a suitable fastener.

In a typical construction, the proximal end portion of the bolt is provided with external helical threads selected to allow the mechanical coupling of a nut or threaded fastener thereto in a conventional manner. It is to be appreciated, however, that the proximal end may be provided with striations or other structures configured for engagement by other types of fasteners used in mine reinforcing systems. Although not essential, most preferably the bolt is comprised of a unitary cast steel piece.

The portion of the anchor bolt closest to the toe of the drill hole is typically provided as a substantially rigid and non-deformable portion used to firmly anchor the tendon in place. The rigid non-deformable anchor portion has a series of comparably larger primary anchor members. The primary anchoring members of the rigid anchor portion are configured to provide enhanced surface contact between the rigid anchor portion of the tendon and the anchoring grout. Preferably, the rigid anchor portions are substantially non-deformable in the axial direction, having a deformation range, or range at which the tendon will longitudinally or elongate prior to fracture or catastrophic failure of less than 0.25%, and preferably less than about 0.1%. The rigid anchor portion has a preferred length of about 10 to 150 cm, however, other lengths are possible. In this manner, the rigid anchor portion is used to fixedly retain the distalmost end portion of the anchor tendon closest to the drill hole toe in a fixed position relative to the laterally adjacent rock complex.

At least one plastically deformable portion having a preferred length of between about 5 to 400 cm are preferably interposed between the distalmost rigid anchoring portion, and the externally threaded proximal portion. The plastically deformable portions are configured to allow for the plastic elongation in the axial direction of the tendon in the event that load forces thereon exceed a predetermined threshold force.

Although not essential, in a most preferred construction, the anchor bolt or tendon also includes at least one deformable anchor portion. The deformable anchor portions have preferred lengths of about 5 to 250 cm and includes secondary anchoring members which may also be in the form of radially and/or longitudinally extending grooves, ribs, slots, studs, bosses, indentations or the like. The height and/or depth of the secondary anchoring members, as well as their longitudinal spacing are selected to provide comparably less bar stiffness and allow increased bar plastically than compared to the rigid anchor portions. The secondary anchoring members are engagable by the anchoring grout to effect the partial coupling of the deformable anchor portion to laterally adjacent portions of the rock complex. The deformable anchor portions are configured for limited axially deformation under load forces which exceed the predetermined threshold force, while maintaining at least partial coupling with the adjacent rock strata. The secondary anchoring members of the deformable anchor portions are smaller in dimension and/or which are provided with greater longitudinal spacing than compared to the primary anchoring members formed along the rigid anchor portions of the tendon. Most preferably, the deformable anchor portions of the bar are configured to provide a deformation range in the axial direction which is selected at less than 0.5%, and preferably less than 0.2%, of the total length of each portion. The secondary anchoring members typically have a radial dimension which is selected smaller than the primary anchor members, and preferably which is at least 25%, and more preferably at least 50% smaller than the average radially dimension of the primary anchor members. The secondary anchoring members along the deformable anchor portions are provided with a spacing and orientation selected to substantially maintain at least partial continued adhesion between the rock strata in the fractured rock zone, to minimize rock fall in the event of ground movement.

Most preferably, the plastically deformable portions are configured to permit a greater degree of elongation than that of the deformable anchor portions. In one simplified construction, the plastically deformable portion of the tendon is interposed between a distalmost rigid anchoring portion and a deformable anchoring portion which is spaced towards the proximalmost end. It is to be appreciated that alternate configurations are possible depending upon the type of rock strata and/or the location of a particular fracture zone. By way of non-limiting example, where the drill hole toe extends into a fault zone which has increased susceptibility to ground movement, the anchor tendon could be formed with deformable anchor portion at its distalmost end.

Accordingly, in one aspect, the present invention resides in a mine roof bolt assembly for securement in a drill hole pre-formed in a rock complex, the bolt assembly including, an elongated tendon extending longitudinally along a tendon axis from a proximal end to a distal end, the tendon being sized for insertion at least partially in said drill hole and including, an externally threaded portion proximate said first end, a substantially non-deformable rigid anchor portion spaced towards said distal end, the rigid anchor portion including a plurality of first anchoring members which are engagable by an anchoring grout to fixedly couple the rigid anchor portion to first laterally adjacent portions of said rock complex under load forces which exceed a predetermined threshold force, a deformable anchor portion remote from said rigid anchor portion, the deformable anchor portion including a plurality of second anchoring members which are engagable by said anchoring grout to at least partially couple the deformable anchor portion to second laterally adjacent portions of said rock complex, the deformable anchor portion configured for limited axial deformation under said load forces to maintain at least partial coupling between the deformable anchor portion and said second laterally adjacent portions of said rock complex, and at least one plastically deformable portion intermediate said rigid anchor portion and said deformable anchor portion, each said plastically deformable portion being deformable axially relative to third laterally adjacent portions of said rock complex under said load forces, and a thread fastener sized for threaded mated engagement with said externally threaded portion.

In another aspect, the present invention resides in a mine roof bolt assembly for securement in a drill hole formed in a rock complex to consolidate rock forces, the bolt assembly including, an anchor tendon elongated along a tendon axis from a first proximal end to a second distal end, the tendon being sized for insertion at least partially in said drill hole, and including, an externally threaded portion proximate said first end, a generally rigid anchor portion spaced towards said second end, the rigid anchor portion including a plurality of first anchoring members which are engagable by an anchoring grout to substantially fixedly retain said rigid anchor portion against movement relative to laterally adjacent portions of said rock complex in the event rock forces exceed a predetermined threshold force, a deformable anchor portion spaced from said rigid anchor portion, the deformable anchor portion including a plurality of second anchoring members engagable by said anchoring grout and having a size and/or spacing selected to permit limited axial deformation of the deformable anchor portion in the event said rock forces exceed the predetermined threshold force, while maintaining at least partial coupling between the deformable anchor portion and laterally adjacent portions of the rock complex, and a generally smooth walled plastically deformable portion configured for axial elongation relative to the rock complex in the event the rock forces exceed the predetermined minimum threshold force, a fastener configured for mated engagement with said externally threaded portion for tightening against said rock complex to compress and consolidate said rock forces.

In a further aspect, the present invention resides in a roof bolt for securement in a drill hole formed in rock strata, the bolt being elongated along a longitudinally extending tendon axis from a proximal end to a distal end, and being sized for insertion at least partially in said drill hole, an externally threaded portion proximate said first end, a rigid anchor portion, the rigid anchor portion including a plurality of primary anchoring members which are engagable by an anchoring grout to substantially fixedly secure said rigid anchor portion relative to laterally adjacent rock strata, and a plastically deformable portion configured for axial deformation relative to laterally adjacent rock strata under deformation load forces exceeding a predetermined threshold force, and wherein the plastically deformable portion is preferentially deformable, with the rigid anchor portion being substantially non-deformable under said deformation load forces.

BRIEF DESCRIPTION OF THE DRAWINGS

Reference may now be had to the following description, taken together with the accompanying drawings in which:

FIGS. 4 to 6 show a series of schematic views of a rock complex, illustrating the initial placement of the mine roof bolt assembly to the position shown in FIG. 1;

FIG. 8 illustrates schematically an anchor tendon for use in mine bolt assembly in accordance with another embodiment of the invention; and FIG. 9 illustrates schematically an anchor tendon for use in the mine roof bolt assembly in accordance with a further embodiment of the invention.

DETAILED DESCRIPTION OF THE PREFERRED EMBODIMENTS

Figure 1:
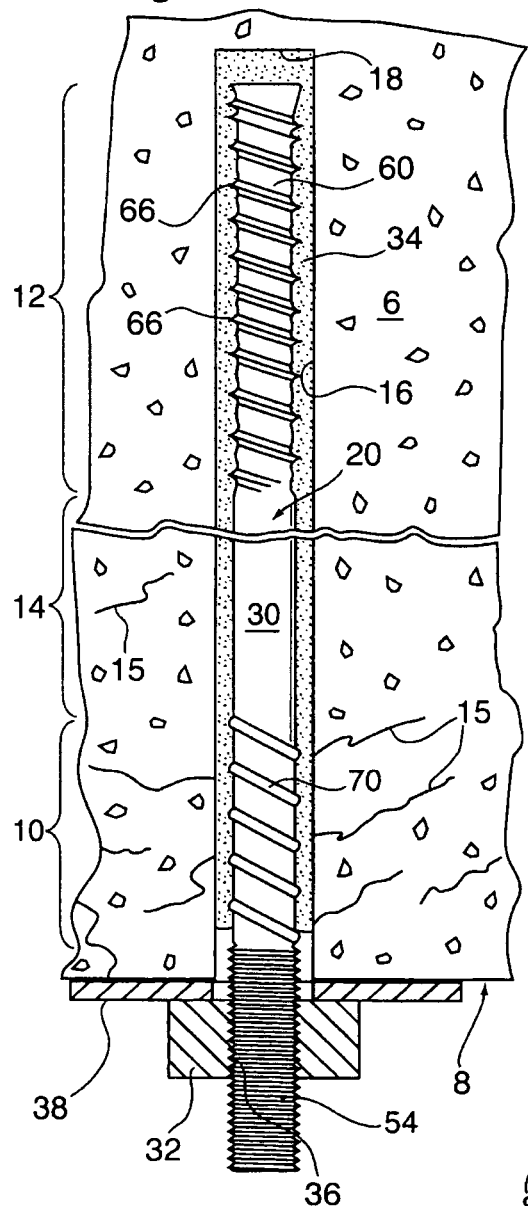
FIG. 1 shows a sectional view of a mine roof bolt assembly in accordance with a preferred embodiment of the invention, illustrating the initial placement of an anchor bolt in a drill hole in the compression and consolidation of a rock complex.
Figure 2:
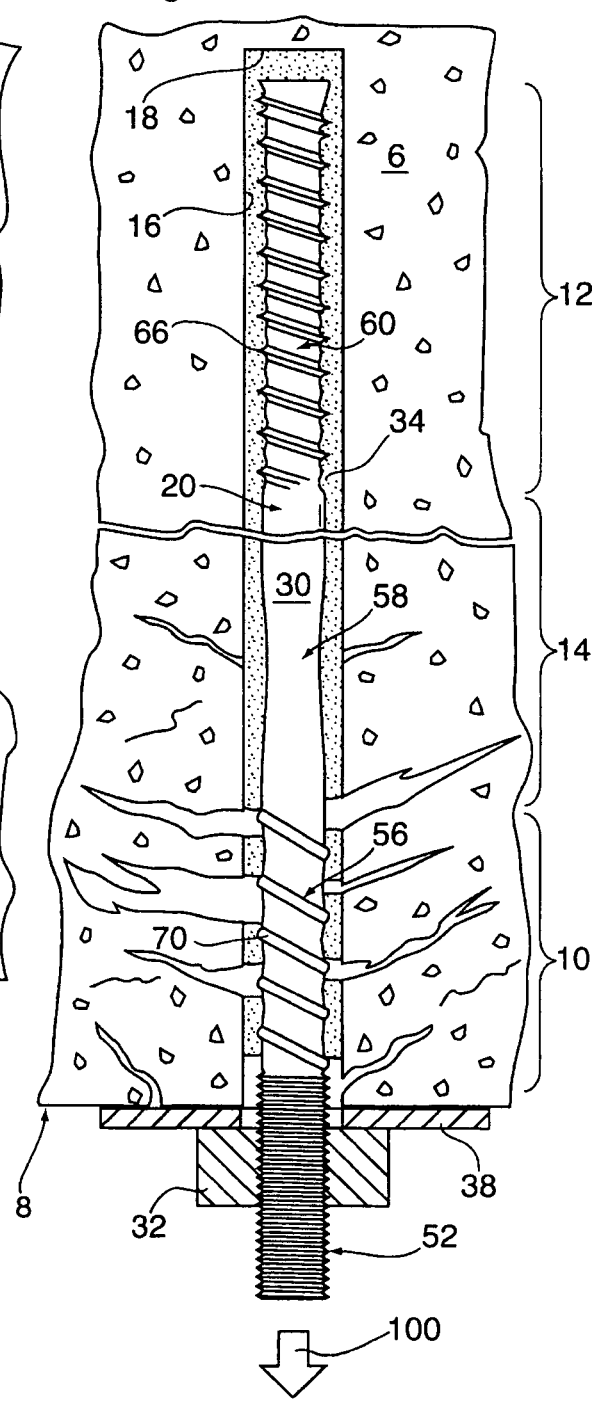
FIG. 2 illustrates a sectional view of the mine roof bolt assembly shown in FIG. 1 following ground movement, illustrating the selective axially deformation of the anchor bolt in the dissipation of ground forces.

FIGS. 1 and 2 illustrate a typical rock complex 6 where a rock face 8 is exposed by blasting. As a result of blasting forces, the rock complex 6 most typically includes a fractured rock zone 10 which is immediately adjacent to the rock face 8, a cohesive rock zone 12, and a transition rock zone 14 intermediate the fractured zone 10 and the cohesive zone 12. The fractured rock zone 10 extends inwardly a distance of approximately between about 0.25 and 0.75 meters from the rock face 8. The fractured zone 10 is most typically characterized by a series of micro-fractures 15 which are produced by the blasting forces. In hard rock applications, the cohesive zone 12 most often consists of unfractured rock strata, with the transition zone 14 consisting substantially of unfractured rock with a few micro-fracture 15.

The present invention relates to a mine roof support system 20 which, as shown best in FIGS. 1 and 2, is adapted not only for the static reinforcement and consolidation of rock forces, but also is configured to absorb and dissipate energy forces which are generated by dilating rock in a rock complex 6.

Depending upon the installation site and geology, a drill hole 16 is drilled into the rock complex 6 to a depth of between about 1.5 and 2.5 meters. Preferably, the drill hole 16 is formed to a depth whereby a distalmost toe 18 of the drill hole 16 locates in the cohesive rock zone 12. FIG. 1 shows best the mine roof support system 20 used to reinforce the rock complex 6 as including a steel anchor tendon or bolt 30, a steel dome anchor nut 32 and an anchoring grout 34. As will be described, the anchoring grout 34 is used to secure the bolt 30 in a fully seated position in the drill hole 16, allowing the nut 32 to be threaded against the rock face 8 of the complex 6 to compress and consolidate rock forces. Optionally, bearing washer plate 38 may be coupled to the anchor bolt 30 to assist in rock consolidation, and contain any falling debris or rocks in the event of rock burst or dilating rock.

Figure 3:
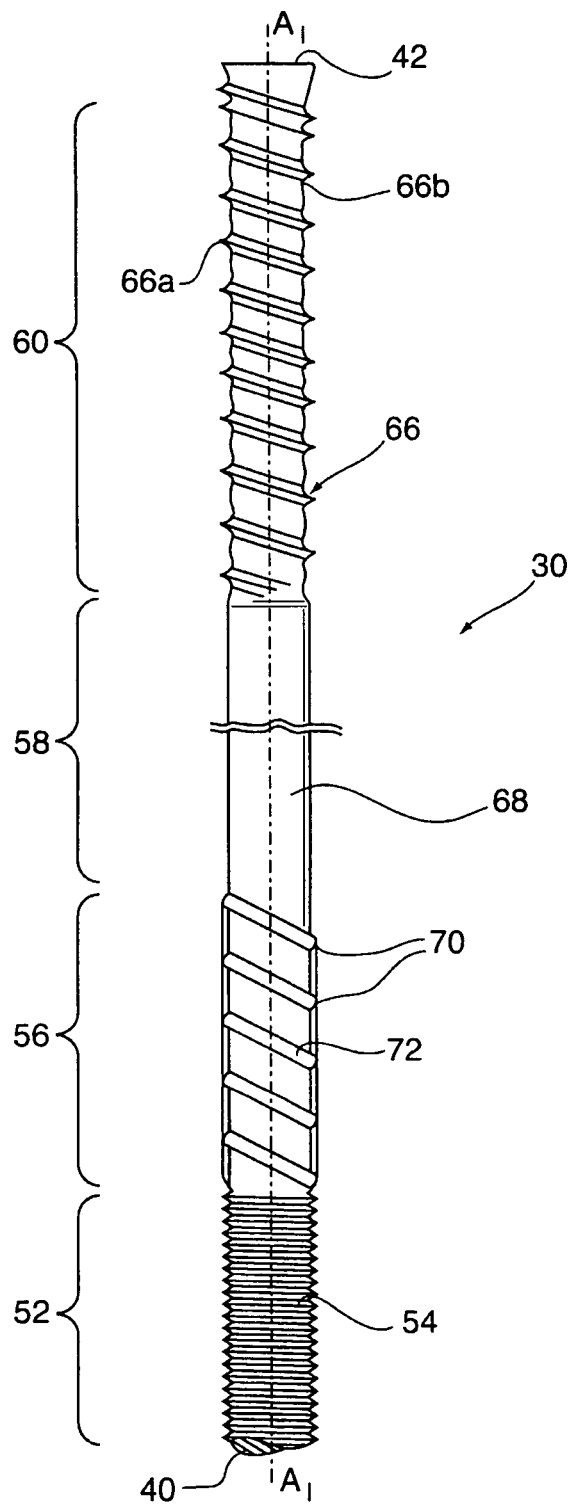
FIG. 3 shows a perspective view of the anchor bolt used in the mine roof bolt assembly of FIG. 1 prior to placement in a drill hole.

FIG. 3 shows best the anchor bolt 30 as being elongated along a longitudinally extending tendon axis $A_1$-$A_1$ from a proximal end 40 to a distalmost end 42. The anchor bolt 30 is formed from 15 to 50 mm, and preferably 20 to 25 mm diameter bar stock and includes a proximalmost externally threaded portion 52, a deformable anchor portion 56, a plastically deformable portion or mid-section 58 and a rigid anchor portion 60. The anchor bolt 30 has an axial length selected having regard to the depth of the drill hole 16 such that when the bolt 30 is fully seated therein with its distalmost end 42 adjacent to the drill hole toe 18, the threaded portion 52 projects outwardly to the distance of 10 to 30 cm beyond the rock face 8. Typically the anchor bolt is provided with an axial length of between about 2 and 3.5 meters, although longer or shorter lengths may be provided.

In a preferred construction, the bolt 30 is formed as a single cast steel piece with each of the threaded portion 52, the deformable anchor portion 56, the mid-section 58 and the rigid anchor portion 60 being integrally formed.

The threaded portion 52 is characterized by external helical threads 54 which are configured for matted mechanical engagement with the internal threads 36 on the anchor nut 32 (FIG. 1).

The rigid anchor portion 60 is adjacent to the distalmost end 42, and extends axially towards proximal end 40, a distance of between about 10 and 300 cm and preferably about 75 to 200 cm. In a preferred construction, the rigid anchor portion 60 is provided with a series of primary anchoring members 66 along its axially length. In a preferred construction, the primary anchoring members 66 each comprise a series of radially extending ribs 66a which are delineated from each other by an interposed groove 66b. The ribs 66a and grooves 66b form comparably large radial deformations along the portion 60 extending in the lateral radial direction a distance of between about 0.5 to 10 mm. The anchoring members 66 are provided for mechanical engagement with the anchoring grout 34 to fixedly retain the anchor portion 60 in the drill hole 16, and against movement relative to the laterally adjacent rock strata of the cohesive rock zone 12. The formation of the anchor portion 60 with the pronounced ribs 66a/groove 66b arrangement provides the anchor portion 60 with increased rigidity, so as to be substantially non-deformable in the axially direction. Preferably the anchoring members 66 are configured to provide the rigid anchor portion 60 with a deformation range in the axially direction of less than about 0.2%, and more preferably less than about 0.1%, upon the application of a predetermined threshold force which is selected as a force applied by dilating rock in an event of ground movement, but less than a force necessary to effect catastrophic failure or fracture of the anchor bolt 30 across the rigid anchor portion 60.

As illustrated in FIGS. 1 and 2, the plastically deformable mid-section 58 is preferably provided as a generally cylindrical length of bar stock. The deformable mid-section 58 most preferably has a length selected at between about 20 and 150 cm, and more preferably between about 50 and 100 cm. The mid-section 58 is configured to plastically deform and axially elongate upon the application of the predetermined threshold force thereto. Most preferably, the deformable mid-section 58 is formed having a deformation range in the axially direction of between about 0.3 to 2% of its axially length, and most preferably about 0.7+/−0.3%. The cylindrical mid-section 58 may be provided with a substantially smooth surface 68 (FIG. 3), or otherwise subject to comparatively small bar deformation, with ribs and/or grooves of a radical dimension selected at between about 0.05 and 3 mm. The cylindrical surface of the plastically deformable mid-section 58 allows for its deformation and movement relative to the laterally adjacent rock strata in the drill hole 16, so as to provide the dynamic control of ground forces.

The deformable anchor portion 56 typically has an axial length selected at between about 5 and 100 cm, and preferably about 10 to 50 cm. The deformable anchor portion 56 is illustrated best in FIG. 3 as including a series of secondary anchoring members 70. The secondary anchoring members 70 extend axially along the length of the deformable anchor portion 56, and in a simplified construction comprise a series of spaced ribs 72. The ribs 72 are provided with a greater axial spacing than compared to the ribs 66a, and are generally smaller in radial dimension than those of the primary anchoring member 66. Most preferably, the secondary anchoring members 70 have an average radial dimension which is selected at least 25% smaller, and preferably at least 50% smaller than the average radial dimension of the primary anchor members 66. In this regard, the secondary ribs may have deformation dimension in the radial direction of between about 0.15 to 5.0 meters.

The sizing and spacing of the secondary anchoring members 70 is selected to allow plastic deformation of the anchor portion 56 in the event load forces on the anchor bolt 30 exceed the predetermined threshold force. Preferably, the secondary anchoring members 70 are configured to allow plastic deformation of the deformable anchor portion 56 with a deformation range of between about 0.2 to 0.6%, and most preferably 0.3+/−1% of its axially length. The secondary anchoring members 70 are configured to maintain at least partial coupling between the deformable anchor portion 56 and at least some of the laterally adjacent rock strata in the fracture zone 10 to minimize rock fall in the event of ground movement.

As shown best in FIGS. 4 to 6, in installation of the anchor bolt 30, a 3 to 5 cm diameter drill hole 16 is drilled to a desired depth into the rock complex 6. Optionally, a grease or release agent may be selectively applied to all or part of the anchor rod, as for example, over the plastically deformable mid-section 58 along and/or part or all of the deformable anchor portion 56. The steel bearing washer plate 38 is optionally positioned over the proximal end 40 of the bolt 30, and the dome or pin nut is initially threaded onto the helical threads 54 of the threaded portion 52. The cast steel dome nut 32 may be of a conventional design, and may typically be provided as a two-part construction having an end cover 70 which is adapted to deform or release upon the application of a threshold torque force. Once the nut 32 and plate 38 have been placed along the anchor bolt 30, the anchor 30 is ready for positioning in the drill hole 16. A number of two-part or grout cartridges 34a,34b (as shown in FIG. 4) are slid axially into the drill hole 16 immediately ahead of the anchor bolt 30. A sufficient number of cartridges 34a,34b are provided to substantially fully encapsulate the anchor bolt 30 along its entire axially length, in a fully grouted arrangement. Immediately following the position of the cartridges 34a,34b, the distal end 42 of the anchor bolt 30 is slid axially into the drill hole 16 so as to rupture the cartridges 34a,34b and assist in grout mixing.

As the anchor bolt 30 is slid inwardly along the drill hole 16, the rigid anchor portion 60 engages and pierces the cartridges 34a,34b with the more pronounced primary anchoring members 66 assisting in effecting the initial mixing of the dispersed grout. The anchor bolt 30 is preferably concurrently rotated about is longitudinal axis $A_1$-$A_1$ by driving the nut 32 in rotation by way of a power socket drive or wrench (not shown). Following the mixing and setting of the anchoring grout 34, the rotation of the nut 32 is stopped, and the grout 34 is permitted to set securing the anchor bolt 30 in place.

Following setting of the anchoring grout 34, the nut is rotated with the necessary torque force to deform and/or detach the nut end cover 70, allowing the nut 32 and plate 38 to be tightened against the rock face 8 (FIG. 1), compressing and consolidating rock forces, as part of a static ground control system.

Figure 7:
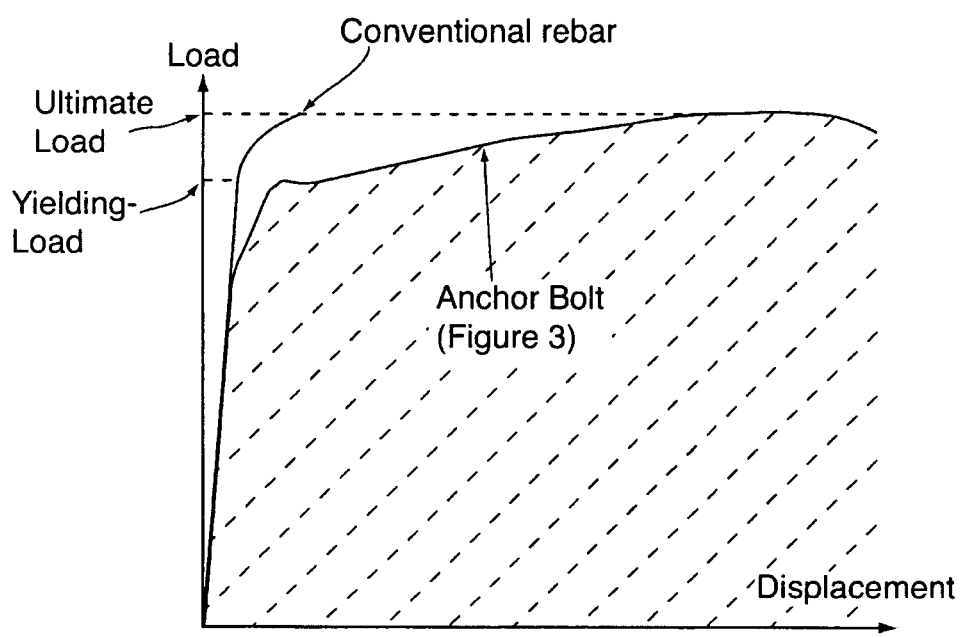
FIG. 7 shows graphically the axial displacement of conventional rebar anchor tendons as contrasted with the anchor bolt of FIG. 3 under load forces.

In the event dynamic rock forces in the fracture zone 10 of the rock complex 6 exceed the predetermined threshold force, the rigid anchor portion 60 of the rod 30 remains undeformed and in place. Concurrently, the partial coupling between the deformable anchor portion 56 and rock strata in the fracture zone 10 results in loading on the steel bearing plate 30 and externally threaded portion 52 in the direction of arrow 100 (FIG. 2). On the application of such the threshold force, both the mid-section 58 and deformable anchor portion 56 plastically deform and axially elongate to the configuration shown in FIG. 2, assisting in the absorption and dissipation of the energy of the dilating rock, allowing for equilibrium to return. The anchor bolt 30 is configured to allow deformation and elongation of upto 2 to 4 cm of overall axial length. Compared to conventional rebar, the anchor bolt 30 of the present invention advantageously achieves increased energy absorption prior to failure, as compared to conventional rebar based reinforcing systems. FIG. 7 shows graphically the dissipation of rock forces achieved by selective plastic deformation of the anchor bolt 30 of FIG. 3, as compared to conventional rebar systems. As the predetermined threshold force is reached, the bar 30 elongates axially, dissipating forces without fracture. Furthermore, because partial coupling is maintained between the anchoring ribs 70 of the deformable anchoring portion 56 and at least some laterally adjacent rock strata in the fracture zone 10, rock falls may be minimized Although FIGS. 1 to 3 illustrate the anchor bolt 30 as having a single deformable anchor portion 56, a single rigid anchor portion 60, and a single plastically deformable mid-section 58 therebetween, the invention is not so limited. It is to be appreciated that in alternate configurations, the anchor bolt 30 could be provided with no or multiple deformable anchor portions 56 and/or no or multiple discreet and plastically deformable portions 58. Similarly, although the preferred construction illustrates the deformable anchor portion 56 as being immediately adjacent to the externally threaded portion 56, the invention is not so limited.

Reference may be had to FIGS. 8 and 9 which show non-limiting alternate anchor bolt constructions, in which like referenced numerals are used to identify like components. In FIG. 8, the anchor bolt 30 is provided with a deformable anchor portion 56, a plastically deformable portion 58, and a rigid anchor portion 60. In the construction shown, the deformable anchor portion 56 is interposed between the plastically deformable portion 58 which is immediately adjacent to the externally threaded portion 52 of the rod and the rigid anchor portion 60.

In FIG. 9 the anchor bolt 30 is provided with an elongated deformable anchor portion 56 and a rigid anchor portion 60, and wherein the substantially smooth plastically deformable mid-section 58 is omitted in its entirety. In an alternate configuration, however, the deformable anchor portion 56 could be omitted, and the anchor bolt 30 provided with a substantially smooth plastically deformable portion 58 and a rigid anchor portion 60 alone.

Although the detailed descriptions describes and illustrates the plastically deformable mid-section or portion 58 as having a substantially smooth cylindrical construction, the invention is not so limited. It is to be appreciated that the plastically deformable portions of the anchor bolt 30 could be provided with textured surfaces, and/or provided with one or more reduced diameter portions to facilitate axial elongation in the event predetermined load forces exceed a selected minimum threshold force.

Although the preferred embodiments of the invention illustrates the rigid anchor portion 60 as having as primary anchoring members 66 a series of radially extending ribs 66*a* and grooves 66*b*, both primary and secondary anchoring members having different configurations may alternately be used without departing from the spirit and scope of the invention.

Although the detailed description describes and illustrates various preferred embodiments, the invention is not so limited. Many modifications and variations will now occur to persons skilled in the art. For a definition of the invention, reference may be had to the appended claims.

We claim:

1. A mine roof bolt assembly for securement in a drill hole pre-formed in a rock complex, the bolt assembly including,
   an elongated tendon extending longitudinally along a tendon axis from a proximal end to a distal end, the tendon being sized for insertion at least partially in said drill hole and including,
   an externally threaded portion proximate said first end,
   a substantially non-deformable rigid anchor portion spaced towards said distal end, the rigid anchor portion including a plurality of first anchoring members which are engagable by an anchoring grout to fixedly couple the rigid anchor portion to first laterally adjacent portions of said rock complex under load forces which exceed a predetermined threshold force,
   a deformable anchor portion remote from said rigid anchor portion, the deformable anchor portion including a plurality of second anchoring members which are engagable by said anchoring grout to at least partially couple the deformable anchor portion to second laterally adjacent portions of said rock complex, the deformable anchor portion configured for limited axial deformation under said load forces to maintain at least partial coupling between the deformable anchor portion and said second laterally adjacent portions of said rock complex, and
   at least one plastically deformable portion intermediate said rigid anchor portion and said deformable anchor portion, each said plastically deformable portion being deformable axially relative to third, laterally adjacent portions of said rock complex under said load forces, and
   a thread fastener sized for threaded mated engagement with said externally threaded portion.

2. The bolt assembly as claimed in claim 1, wherein each said plastically deformable portion includes a generally smooth cylindrical surface.

3. The bolt assembly as claimed in claim 1, wherein said at least one plastically deformable portion has a length in the axial direction selected at between about 5 to 400 cm, and a deformation range in the axial direction of about 0.3 to 2%.

4. The bolt assembly as claimed in claim 1, each of said first and second anchoring members include radially extending protuberances selected from the group consisting of ribs, grooves, slots, indentations, threads, bosses and studs.

5. The bolt assembly as claimed in claim 4, wherein the first anchoring members have an average radial dimension selected at least 25% larger than an average radial dimension of the second anchoring members.

6. The bolt assembly as claimed in claim 1, wherein said bolt assembly is a fully grouted bolt assembly.

7. The bolt assembly as claimed in claim 1, wherein the rock complex comprises a fractured rock zone, at least one of the deformable anchor portion and the plastically deformable portion being spaced for positioning laterally adjacent to said fractured rock zone when said tendon is secured in said drill hole.

8. The bolt assembly as claimed in claim 1, wherein the rock complex comprises a substantially unfractured rock zone, the rigid anchor portion being spaced for generally positioning substantially within said unfractured rock zone when said tendon is secured in said drill hole.

9. The bolt assembly as claimed in claim 1 wherein the plastically deformable portion has a deformation range in the axial direction which is selected greater than that of the externally threaded portion, and a radial diameter selected at between about 15 mm and 50 mm.

10. The bolt assembly as claimed in claim 1 wherein the tendon comprises a unitary cast steel piece.

11. A mine roof bolt assembly for securement in a drill hole formed in a rock complex to consolidate rock forces, the bolt assembly including,
   an anchor tendon elongated along a tendon axis from a first proximal end to a second distal end, the tendon being sized for insertion at least partially in said drill hole, and including,
   an externally threaded portion proximate said first end,
   a generally rigid anchor portion spaced towards said second end, the rigid anchor portion including a plurality of first anchoring members which are engagable by an anchoring grout to substantially fixedly retain said rigid anchor portion against movement relative to laterally adjacent portions of said rock complex in the event rock forces exceed a predetermined threshold force,
   a deformable anchor portion spaced from said rigid anchor portion, the deformable anchor portion including a plurality of second anchoring members engagable by said anchoring grout and having a size and/or spacing selected to permit limited axial deformation of the deformable anchor portion in the event said rock forces exceed the predetermined threshold force, while maintaining at least partial coupling between the deformable anchor portion and laterally adjacent portions of the rock complex, and
   a generally smooth walled plastically deformable portion configured for axial elongation relative to the rock complex in the event the rock forces exceed the predetermined minimum threshold force,
   a fastener configured for mated engagement with said externally threaded portion for tightening against said rock complex to compress and consolidate said rock forces.

12. The mine roof bolt assembly as claimed in claim 11, wherein the smooth walled deformable portion is intermediate said rigid and deformable anchor portions.

13. The mine roof bolt assembly as claimed in claim 12, wherein the anchor tendon comprise a steel bolt, the rock complex comprises a fractured rock strata zone and a substantially unfractured rock strata zone, the deformable portion being spaced for generally positioning substantially with said fractured rock strata zone when said bolt assembly is secured in said drill hole.

14. The mine roof bolt assembly as claimed in claim 13, wherein the deformable anchor portion has a length in the axial direction selected at between about 5 to 250 cm, and a deformation range in the axial direction of approximately 0.1 to 0.6%.

15. The mine roof bolt assembly as claimed in claim 14, wherein the rigid anchor portion has a length in the axial direction selected at between about 10 and 200 cm, and a deformation range in the axial direction of less than about 0.2%.

16. The mine roof bolt assembly as claimed in claim 13, wherein the plastically deformable portion has a length in the axial direction selected at between about 20 to 150 cm, and a deformation range in the axial direction of 0.3 to 2%.

17. A roof bolt for securement in a drill hole formed in rock strata, the bolt being elongated along a longitudinally extending tendon axis from a proximal end to a distal end, and being sized for insertion at least partially in said drill hole,
   an externally threaded portion proximate said first end,
   a rigid anchor portion, the rigid anchor portion including a plurality of primary anchoring members which are engagable by an anchoring grout to substantially fixedly secure said rigid anchor portion relative to laterally adjacent rock strata,
   a plastically deformable portion configured for axial deformation relative to laterally adjacent rock strata under deformation load forces exceeding a predetermined threshold force, the plastically deformable portion comprises a generally cylindrical bar having bar deformations extending less than about 3 mm in the radial direction and an axial length of between about 50 and 100 cm,
   a deformable anchor portion, including a plurality of secondary anchoring members which are engagable by said anchoring grout to fixedly secure part of the deformable anchor portion to laterally adjacent rock strata, while permitting limited axial deformation under said deformation load forces,
   wherein the plastically deformable portion is preferentially deformable, with the rigid anchor portion being substantially non-deformable under said deformation load forces, and the deformable anchor portion has an axial length of between about 10 to 50 cm, and a deformation range in the axial direction of 0.2 to 0.6%.

18. The roof bolt as claimed in claim 17, wherein the plastically deformable portion is intermediate the rigid anchor portion and the deformable anchor portion.

19. The roof bolt as claimed in claim 18, wherein the rigid anchor portion is substantially adjacent to said distal end.

20. The roof bolt as claimed in claim 17, wherein the rigid anchor portion has a length in the axial direction selected at between about 50 and 300 cm, and a deformation range in the axial direction of less than about 0.1%.

21. The roof bolt as claimed in claim 17, wherein the secondary anchoring members extend in a radial direction a distance of between about 0.15 to 5 mm and are selected from the group consisting of ribs, grooves, slots, indentations, threads, bosses and studs.

22. The roof bolt as claimed in claim 21, wherein the primary anchoring members are selected from the group consisting of ribs, grooves, slots, indentations, threads, bosses and studs.

23. The roof bolt as claimed in claim 22, wherein the primary anchoring members have an average radial dimension selected at least 25% larger than an average radial dimension of the second anchoring members.

24. The roof bolt as claimed in claim 17, wherein said bolt assembly is a fully grouted bolt assembly.

25. The roof bolt as claimed in claim 17 wherein the externally threaded portion, the rigid anchor portion, the deformable anchor portion and the plastically deformable portion are integrally formed as a unitary structure.

* * * * *